(12) United States Patent
Cheng et al.

(10) Patent No.: US 6,406,521 B1
(45) Date of Patent: Jun. 18, 2002

(54) PROCESS FOR PURIFYING PROPYLENE

(76) Inventors: Linda S. Cheng, UOP LLC 25 E. Algonquin Rd., P.O. Box 5017, Des Plaines, IL (US) 60017-5017; Joel Padin; Salil U. Rege, both of University of Michigan, Ann Arbor, MI (US) 48109-2136; Stephen T. Wilson, UOP LLC 25 E. Algonquin Rd., P.O. Box 5017, Des Plaines, IL (US) 60017-5017; Ralph T. Yang, University of Michigan, Ann Arbor, MI (US) 48109-2136

( * ) Notice: Subject to any disclaimer, the term of this patent is extended or adjusted under 35 U.S.C. 154(b) by 0 days.

(21) Appl. No.: 09/451,645

(22) Filed: Nov. 30, 1999

(51) Int. Cl.$^7$ .............................................. B01D 53/047
(52) U.S. Cl. ............................... 95/98; 95/101; 95/102; 95/105; 95/144; 95/902
(58) Field of Search .............................. 95/96–107, 110, 95/111, 144, 900, 902

(56) References Cited

U.S. PATENT DOCUMENTS

| | | | | |
|---|---|---|---|---|
| 2,978,407 A | * | 4/1961 | Tuttle et al. | 95/104 X |
| 3,176,444 A | | 4/1965 | Kiyonaga | 55/26 |
| 3,176,445 A | * | 4/1965 | Collins et al. | 95/144 X |
| 3,266,221 A | * | 8/1966 | Avery | 95/144 X |
| 3,306,006 A | * | 2/1967 | Urban | 95/144 X |
| 3,430,418 A | | 3/1969 | Wagner | 55/25 |
| 3,703,068 A | | 11/1972 | Wagner | 55/21 |
| 3,727,376 A | * | 4/1973 | Szirmay | 95/111 |
| 3,986,849 A | | 10/1976 | Fuderer et al. | 55/25 |
| 4,070,164 A | * | 1/1978 | Miwa et al. | 95/144 |
| RE29,941 E | * | 3/1979 | Bird | 95/98 X |
| 4,310,440 A | | 1/1982 | Wilson et al. | 252/435 |
| 4,554,141 A | * | 11/1985 | Scull et al. | 95/144 |
| 4,567,029 A | | 1/1986 | Wilson et al. | 423/306 |
| 4,769,047 A | * | 9/1988 | Dye | 95/97 |
| 4,861,938 A | | 8/1989 | Lewis et al. | 585/640 |
| 4,973,792 A | | 11/1990 | Lewis et al. | 585/638 |
| 5,095,163 A | | 3/1992 | Barger | 585/640 |
| 5,104,425 A | * | 4/1992 | Rao et al. | 95/144 X |
| 5,126,308 A | | 6/1992 | Barger et al. | 502/214 |
| 5,171,333 A | * | 12/1992 | Maurer | 95/103 X |
| 5,191,141 A | | 3/1993 | Barger et al. | 585/640 |
| 5,245,099 A | * | 9/1993 | Mitariten | 95/144 X |
| 5,365,011 A | | 11/1994 | Ramachandran et al. | 585/829 |
| 5,507,857 A | * | 4/1996 | Kumar et al. | 95/144 X |
| 5,518,527 A | * | 5/1996 | Tomizuka et al. | 95/144 X |
| 5,744,687 A | | 4/1998 | Ramachandran et al. | 585/829 |

OTHER PUBLICATIONS

Article entitled "Better Ethylene Separation Unit" by V. Kaiser and M. Picciotti, *Hydrocarbon Processing*, Nov. 1988, pp. 57–61.

Paper entitled "Olefin–Paraffin Separations by Adsorption: Equilibrium Separation by $\pi$–Complexation vs. Kinetic Separation" by S.U. Rege, J. Padin, and R.T. Yang, *AIChE Journal*, vol. 44, 1998, p. 799.

\* cited by examiner

*Primary Examiner*—Robert H. Spitzer
(74) *Attorney, Agent, or Firm*—John G. Tolomei; Frank S. Molinaro; Mark Goldberg

(57) ABSTRACT

A process is provided for the concentration and recovery of propylene from propane by a pressure swing adsorption (PSA) process using an adsorbent comprising AlPO-14. A PSA process is used to remove propylene from a $C_3$ hydrocarbon stream comprising propylene and propane. The PSA process of the present invention can be employed in petroleum refining and petrochemical processes to purify and separate propylene from mixtures of propylene and propane without fractionation.

4 Claims, 3 Drawing Sheets

PROCESS FOR PURIFYING PROPYLENE

FIELD OF THE INVENTION

This invention pertains to the field of separating and recovering at least one gas component from a feedstream by an adsorption process. More particularly, the present invention relates to a pressure swing adsorption (PSA) process for separating a hydrocarbon feed gas comprising propylene and propane into a fraction comprising predominantly propylene and a fraction comprising propane.

BACKGROUND OF THE INVENTION

Light olefins serve as the building blocks for the production of numerous chemicals. Light olefins have traditionally been produced through the process of steam or catalytic cracking. Propylene, a light olefin consisting of three carbon atoms wherein two of the carbon atoms are joined by a double bond, has a great number of commercial applications, particularly in the manufacture of polypropylene, isopropyl alcohol, propylene oxide, cumene, synthetic glycerol, isoprene, and oxo alcohols. When propylene is produced in the presence of hydrogen, it is often accompanied by the formation of propane. Propane is a paraffin, a saturated hydrocarbon which is used as a component of household fuel, as an extractant, a refrigerant, or an aerosol propellant. Generally, it is required to separate propane from propylene before the propylene can be used to produce more valuable products. However, the boiling points of propane and propylene are very close to one another and separating propane from propylene has traditionally required an energy-intensive fractionation process known as superfractionation. Superfractionation generally refers to fractional distillation of compounds having the same number of carbon atoms per molecule.

The reaction product produced by a conversion process such as fluid catalytic cracking, pyrolysis of naphtha, and conversion of methanol to olefins is a light gas stream containing lighter components (e.g. hydrogen, nitrogen, etc.) methane, ethane and a substantial quantity of hydrocarbons of higher molecular weight, for example, propane, butane, pentane, and often their unsaturated analogs. Separation of these components to recover propylene requires a complex energy-intensive scheme, thus creating a need for more efficient separation processes which yield higher recovery levels of propylene. A typical ethylene separation section of an ethylene plant containing both cryogenic and fractionation steps to recover an ethylene product with a purity exceeding 99.5% ethylene is described in an article by V. Kaiser and M. Picciotti entitled, "Better Ethylene Separation Unit," that appeared in Hydrocarbon Processing, November 1988, pages 57–61 and is herein incorporated by reference. In the production of propylene, a by-product of the conversion process, a reactor effluent stream recovered from the conversion process is passed to a complex series of separation stages involving a combination of compression and fractionation steps to recover a $C_3$ hydrocarbon stream. Conventionally, the $C_3$ hydrocarbon stream is passed to a superfractionator known as a $C_3$ splitter to perform the separation of propylene from a feedstream consisting essentially of propylene and propane to produce a high purity propylene stream and a propane-containing stream. The $C_3$ splitter, or superfractionator, makes the final separation between propylene and propane. In this separation, propylene is removed as an overhead stream, and the propane stream is removed as the $C_3$ splitter bottom stream. The higher the purity of the propylene desired, the more energy intensive is the degree of superfractionation in the $C_3$ splitter. Typically, the $C_3$ splitter or propane/propylene splitter requires so many theoretical separation stages, or trays, that the column is constructed as two separate towers: a rectifier and a stripper. Lighter components such as hydrogen and methane which may be present in the $C_3$ hydrocarbon stream further complicate the separation.

PSA provides an efficient and economical means for separating a multi-component gas stream containing at least two gases having different adsorption characteristics. The more strongly adsorbable gas can be an impurity which is removed from the less strongly adsorbable gas which is taken off as product; or, the more strongly adsorbable gas can be the desired product which is separated from the less strongly adsorbable gas. In PSA, a multi-component gas is typically fed to at least one of a plurality of adsorption zones at an elevated pressure effective to adsorb at least one component, while at least one other component passes through. At a defined time, the feedstream to the adsorber is terminated and the adsorption zone is depressurized by one or more co-current depressurization steps wherein pressure is reduced to a defined level which permits the separated, less strongly adsorbed component or components remaining in the adsorption zone to be drawn off without significant concentration of the more strongly adsorbed components. Then, the adsorption zone is depressurized by a counter-current depressurization step wherein the pressure on the adsorption zone is further reduced by withdrawing desorbed gas counter-currently to the direction of the feedstream. Finally, the adsorption zone is purged and repressurized. The combined gas stream produced during the counter-current depressurization step and the purge step is typically referred to as the tail gas stream. The final stage of repressurization is typically performed by introducing a slipstream of product gas comprising the lightest gas component produced during the adsorption step. This final stage of repressurization is often referred to as product repressurization. In multi-zone systems, there are typically additional steps and those noted above may be done in stages. U.S. Pat. No. 3,176,444 issued to Kiyonaga, U.S. Pat. No. 3,986,849 issued to Fuderer et al., and U.S. Pat. Nos. 3,430,418 and 3,703,068 both issued to Wagner, among others, describe multi-zone, adiabatic PSA systems employing both co-current and counter-current depressurization and the disclosures of these patents are incorporated by reference in their entireties.

Various classes of adsorbents are known to be suitable for use in PSA systems, the selection of which is dependent upon the feedstream components and other factors. Molecular sieves such as the microporous crystalline zeolite and non-zeolitic catalysts, particularly aluminophosphates (AWPO) and silicoaluminophosphates (SAPO), are known to promote reactions such as the conversion of oxygenates to hydrocarbon mixtures. Numerous patents describe this process for various types of these catalysts: U.S. Pat. No. 4,310,440 (Wilson et al.); U.S. Pat. No. 4,567,029 (Wilson et al.); U.S. Pat. No. 5,095,163 (Barger); U.S. Pat. No. 5,191,141 (Barger); U.S. Pat. No. 5,126,308 (Barger); U.S. Pat. No. 4973792 (Lewis); and U.S. Pat. No. 4,861,938 (Lewis). The above U.S. patents are hereby incorporated by reference.

U.S. Pat. Nos. 5,744,687 and 5,365,011 disclose a process for the integration of a PSA zone containing an adsorbent selective for the adsorption of ethylene and propylene from a catalytic cracking process at an adsorption temperature above 50° C. to about 250° C. The adsorbent is selected from the group consisting of zeolite 4A, zeolite 5A, zeolite 13×, and mixtures thereof. The adsorbed ethylene and propylene is desorbed from the adsorbent by reducing the pressure or raising the temperature, or by reducing the pressure and raising the temperature.

A paper entitled, "Olefin-Paraffin Separations by Adsorption: Equilibrium Separation by π-Complexation vs. Kinetic Separation", by S. U. Rege, J. Padin, and R. T. Yang and published in the AIChE Journal, volume 44, 1998, at page 799 and herein incorporated by reference, compares the performance of a PSA process using 4A zeolite, carbon molecular sieve, and a sorbent based on a silica substrate over which silver nitrate has been dispersed.

Recovering propylene from cracking and oxygenate conversion processes is an expensive and complex process involving extensive compression and superfractionation to separate ethylene from the $C_3$ hydrocarbons and finally superfractionation to separate the propylene from the propane. Processes are sought which enable the concentration and recovery of the propylene from cracking and oxygenate conversion effluent without expensive superfractionation steps.

It is an objective of the present invention to provide a separation process for the production of high purity propylene which does not require superfractionation.

SUMMARY OF THE INVENTION

It was discovered that the non-zeolitic molecular sieve AlPO-14 at a temperature above 120° C. and below a temperature of incipient reaction can be employed as an adsorbent in a PSA process to replace the superfractionation step in cracking and oxygenate conversion schemes to produce a high purity propylene product. AlPO-14 has been generally considered as a catalyst for hydrocarbon conversion reactions. Its narrow, small pore structure was discovered to be useful for adsorbing propylene while essentially excluding the co-adsorption of propane when the adsorption temperature was above the adsorption temperature of 120° C. Furthermore, the working capacity of the AlPO-14 did not become significantly lessened by successive adsorption/desorption cycles. The use of the PSA process wherein the selective adsorbent comprises AlPO-14 and the adsorption temperature is 120° C. provides a process for the production of a high purity propylene product without using conventional superfractionation methods. The resulting process developed for propylene separation will result in a propylene/propane separation zone of lower capital cost and loser operating cost than conventional $C_3$ splitter based schemes.

In one embodiment, the present invention is a process for the production of a high purity propylene stream from a mixture comprising propane and propylene. The process comprises contacting the mixture with a selective adsorbent comprising AlPO-14 at a temperature between 120° C. and below a temperature of incipient reaction at an adsorption pressure in an adsorption step to provide an adsorption effluent stream comprising propane, and in desorption step at a desorption pressure lower than the adsorption pressure desorbing propylene to provide a propylene product stream.

In another embodiment, the present invention is a PSA process comprising a series of steps. A feed stream comprising propylene and propane and a recycle stream comprising propylene are passed at an adsorption temperature between 120° C. and below a temperature of incipient reaction and an adsorption pressure to a first adsorption bed in an adsorption zone comprising at least two adsorption beds and an adsorption effluent comprising propane is withdrawn. Each of the adsorption beds contains an AlPO-14 adsorbent for the selective adsorption of propylene. The passing of the feed stream and recycle stream to the first adsorption bed is terminated prior to breakthrough of propylene. The first adsorption bed is co-currently purged in a co-purge step with a purge gas stream at a purge pressure essentially equal to the adsorption pressure and a purge effluent stream is withdrawn from the first adsorption bed. The co-purge step is terminated and the first adsorption bed is desorbed in a counter-current blowdown step to provide a high purity product stream comprising propylene. At least a portion of the high purity product stream is compressed to provide the purge gas stream and the purge effluent stream is recycled to the adsorption step to provide the recycle stream. The first adsorption bed is co-currently repressurized with the feed stream. The above process steps of adsorption, co-current purge, counter-current blowdown, and repressurization are repeated to provide a continuous process.

DETAILED DESCRIPTION OF THE INVENTION

Figure 1:
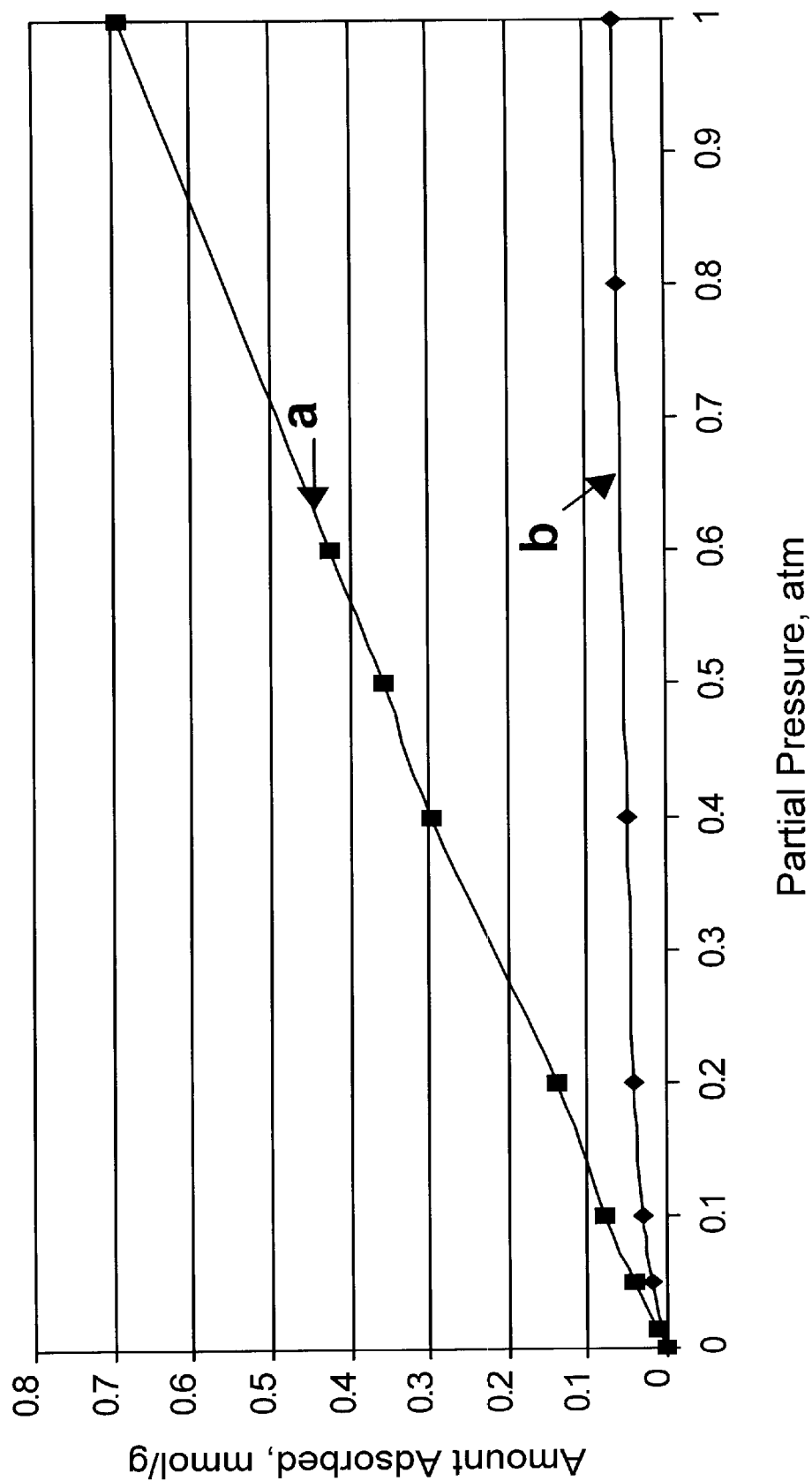
FIG. 1 is a chart showing the adsorption isotherms of propylene and propane over the AlPO-14 adsorbent.

The present invention is directed to the separation of propane from a feed stream comprising propane and propylene in a PSA process to produce an adsorbed phase rich in propylene and a non-adsorbed phase rich in propane. Some non-condesables such as carbon dioxide, carbon monoxide, and hydrogen which may be present in commercially available feed streams comprising propylene and propane will appear in the non-adsorbed phase. Upon desorption at a desorption pressure, that is reduced relative to the adsorption pressure, the propylene is recovered as a high purity propylene product. Preferably, a high purity propylene product comprises at least 95 mol-% propylene, and more preferably, the high purity propylene product comprises at least 99 mol-% propylene.

The feed stream, comprising propane and propylene, may contain from about 5 to about 90 mol-% propylene with the remainder being essentially propane. The feed stream may be derived from any hydrocarbon cracking or formation process generally employed in the petroleum refining and petrochemical industries. Such cracking processes may include the cracking of natural gas, naphtha, and atmospheric gas oil for the production of ethylene and also producing propylene as a by-product. The feed stream may also be produced in a process for the conversion of an oxygenate into light olefins. In general, the reaction products of these processes are compressed and fractionated in a conventional manner to produce the feed stream for the present invention.

The adsorbent of the present invention preferably is incorporated into solid particles in which the adsorbent is present in an amount effective to promote the desired hydrocarbon separation. Solid particles comprising the molecular sieve and a binder may be formed into shapes such as pills, pellets, granules, rings, spheres, etc. Generally, a slurry mixture comprising the molecular sieve, binder, and water is prepared and the slurry mixture is blended by sonification, milling, etc. prior to formation of the solid particles by extrusion, spray-drying, etc. In one aspect, the solid particles comprise an adsorptively effective amount of the adsorbent and at least one matrix material, preferably selected from the group consisting of binder materials, filler materials, and mixtures thereof to provide a desired property or properties, e.g., desired catalyst dilution, mechanical strength, and the like to the solid particles. Filler and binder materials include, for example, synthetic and naturally occurring substances such as metal oxides, clays, silicas, aluminas, silica-aluminas, silica-magnesias, silica-zirconias, silica-thorias, silica-berylias, silica-titanias, silica-alumina-thorias, silica-alumina-zirconias, aluminophosphates, mixtures of these, and the like. The preparation of solid particles comprising catalyst and matrix materials is conventional and well known in the art and, therefore, need not be discussed in detail.

It was discovered that AlPO-14, a small pore aluminophosphate molecular sieve, selectively adsorbed propylene and essentially excluded propane. AlPO-14 as disclosed in U.S. Pat. No. 4,310,440 is a member of a class of aluiminophosphates (AlPO$_4$-n) which have various crystalline structures (current references to such compounds no longer use the subscript 4). The class of materials contains structures wherein the frameworks are composed of tetrahedral AlO$_4$ and PO$_4$ units. One characteristic of this class of non-zeolitic materials is that the structures do not contain framework charge balancing cations like those contained in zeolite molecular sieve structures. Although non-zeolite frameworks are electrically neutral, adsorbate molecules, that is, molecules adsorbed on the framework of these materials, can interact with a local non-zero electric field present or the surface of the structure. It is believed that this local electric field can arise from the difference in electronegativities between the aluminum and phosphorous atoms making up the structure. One key feature of the AlPO-14 structure is its pore window diameter which is about 3.8 angstroms. Although the pore size is of the AlPO-14 is essentially the same as a zeolite 4A, the AlPO-14 has a different crystalline structure which can be considered a channel system of small pores that is capable of excluding the entry of propane by a steric hindrance effect which prevents the propane from entering into the internal pore/channel structure, while permitting the relatively rapid adsorption and desorption of propylene. Adsorption isotherm data at 120° C. and about 1 atmosphere for pure propylene exhibits an almost linear isotherm over a pressure range from about 0.1 bar to about 1 bar. Over this same adsorption temperature and pressure range, essentially no propane was adsorbed on the AlPO-14 adsorbent the equilibrium capacity of the AlPO-14 adsorbent at these conditions was found to be about 0.7 millimoles per gram for propylene and about 0.06 millimoles per gram for propane. The linear isotherm for propylene at these conditions and the effective exclusion of propane provides the AlPO-14 with a working capacity which can be exploited in a PSA process. Furthermore, although like zeolite adsorbents, the AlPO-14 can become reactive at higher temperatures, the AlPO-14 characteristic neutral surface is believed to be more advantageous by being less reactive than zeolite materials which have surface cations. The adsorption step is carried out at a temperature of 120° C. to avoid the buildup of adsorbate in a cyclic PSA process. The upper adsorption temperature is preferably below a temperature of incipient reaction, or polymerization, of the propylene on the surface of the adsorbent. It is believed that the upper adsorption temperature is about 250° C. Preferably the adsorption pressure at which the adsorption step is fled out is about 1 bar or above about 1 bar. Preferably, the adsorption pressure comprises a pressure from about 0.5 bar to about 1 bar. The desorption step is carried out at an absolute pressure below the adsorption pressure. Preferably, the desorption pressure is less than about 1 bar and more preferably, the desorption pressure ranges between about 0.1 bar and about 0.5 bar.

In the operation of a continuous PSA process, at least two adsorbent beds containing the selective adsorbent are arranged in parallel and adapted to be operated in a cyclic manner comprising adsorption and desorption steps. In such systems, the adsorbent beds are cycled out-of-phase to provide a continuous PSA process wherein a continuous flow of the feed stream to the PSA process and the continuous recovery of a pure propylene product stream from process occurs.

According to the present invention, a feed stream is passed to a first adsorbent bed. The direction of the flow of the feed stream through the first adsorbent bed is a point of reference for all other flows in the PSA process. The flows are said to be either co-current—in the same direction, or counter-current—in a direction opposite to the direction of the feed stream passing through the adsorbent bed. In an adsorption step, the feed stream is passed through the first adsorbent bed, a non-adsorbed stream comprising propane is withdrawn as an adsorption effluent, and a propylene adsorption front is established traveling through the first adsorbent bed. The adsorption step is continued until the propylene adsorption front reaches a desired point in the first adsorption bed, prior to the breakthrough of propylene. At this point, the adsorption step is terminated and the first adsorbent bed is co-currently purged in a co-purge step with a propylene-rich purge gas, such as compressed propylene product. The co-purge step is employed to advance the propylene adsorption front in the first adsorbent bed and displace propane from the void spaces in the adsorbent bed. During the co-purge step, a recycle stream comprising propylene is withdrawn from the first adsorbent bed and admixed with the feed stream prior to the passing of the feed stream to another adsorbent bed undergoing an adsorption step. At the conclusion of the co-purge step, the first adsorbent bed is counter-currently depressurized to a desorption pressure in a blowdown step and a desorption effluent stream comprising high purity propylene is withdrawn. A portion of the desorption effluent stream, or propylene product stream is compressed to about the adsorption pressure to provide the co-purge stream. The first adsorbent bed is repressurized to about the adsorption pressure in a re-pressurization step by the introduction of the feed stream to the first adsorbent bed. The alternating of adsorbent beds for the steps of adsorption, co-purge, counter-current depressurization, and repressurization as described hereinabove is continued to provide a continuous process for purifying propylene and producing a high purity propylene product.

EXAMPLES

Example I

Figure 2:
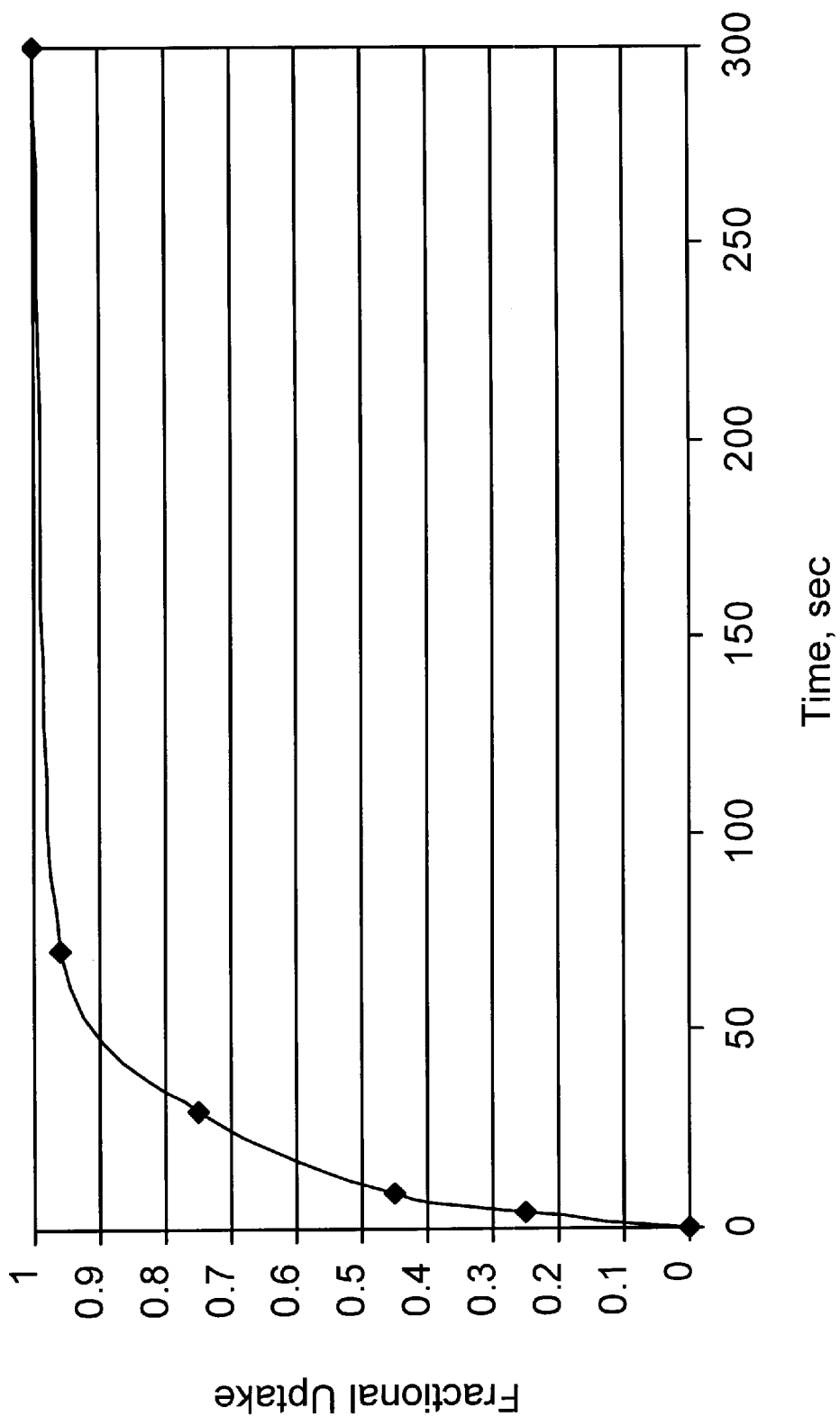
FIG. 2 is a chart showing the uptake rate of propylene on AlPO-14.

Equilibrium isotherms and uptake curves were developed using a Micromeritics ASAP 2010 surface area analyzer and a Shimadzu TGA-50 thermogravimetric analyzer following procedures well-known to those skilled in the art. Prior to measurements of the isotherms, samples of the adsorbent were initially dehydrated by heating in a vacuum at about 350° C. The ASAP 2010 uses a volumetric system to obtain adsorption isotherms and uptake curves. All uptake curves were measured at a stepped pressure increment from about 0.01 to about 0.1 atm. The equilibrium adsorption isotherm at 120° C. and 1 atm is shown in FIG. 1 for pure propylene (a) and pure propane (b) adsorbed separately on AlPO-14. The isotherms showed that over a partial pressure range from about 0 to about 1.0 atm, propylene was adsorbed while propane was essentially excluded from the adsorbent. Furthermore, the propylene isotherm approached a linear shape over the entire range of partial pressure. FIG. 2 shows the uptake time in seconds for the adsorption of pure propylene on the AlPO-14 adsorbent. The sharp initial rise in the fractional uptake of the propylene on the AlPO-14 adsorbent is a measure of the diffusion behavior of the adsorbent.

Example II

Figure 3:
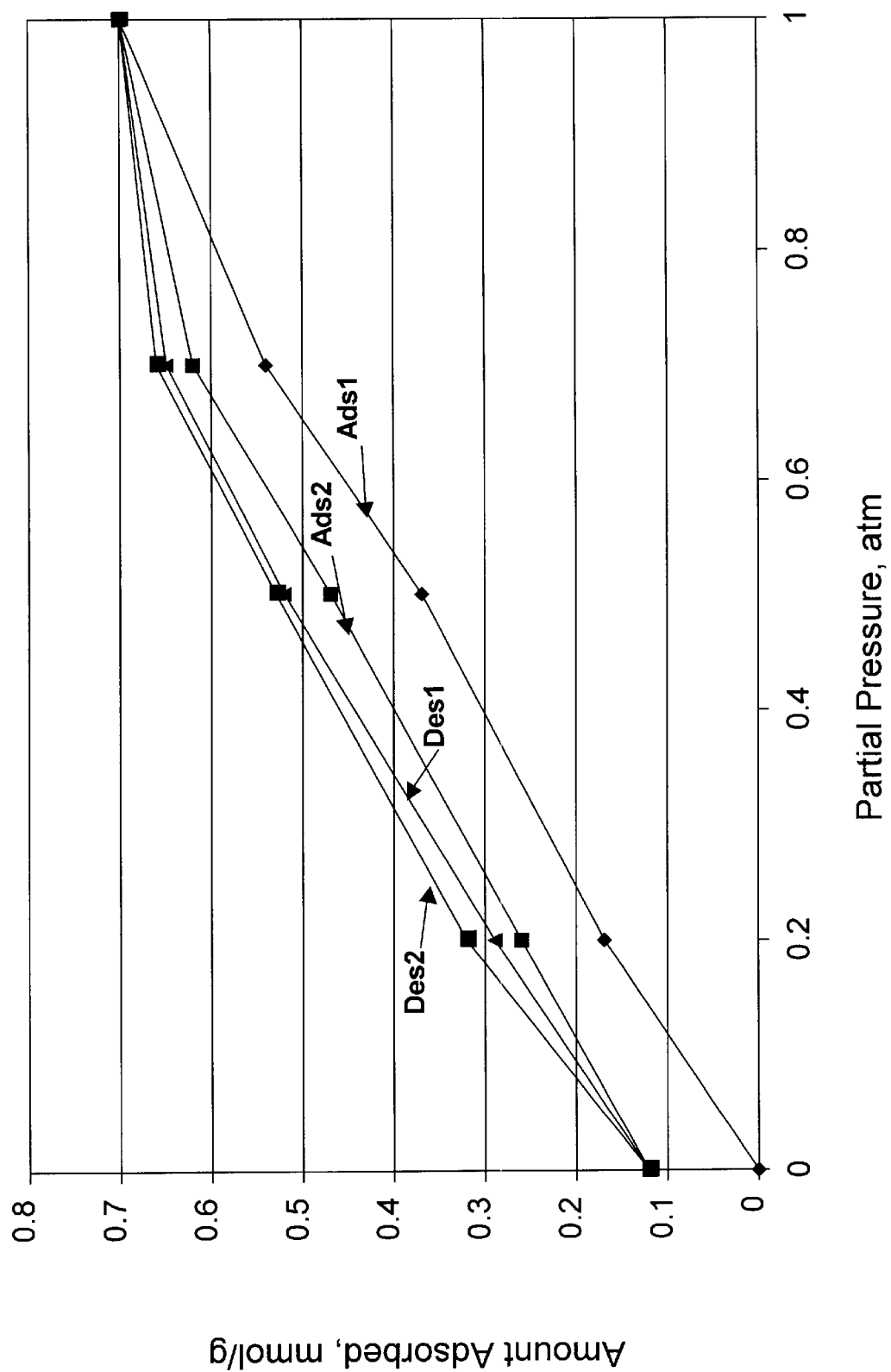
FIG. 3 is a chart showing the degree of adsorption irreversibility of the AlPO-14 sorbent for propylene.

FIG. 3 shows a series of adsorption and desorption isotherms of pure propylene on AlPO-14 adsorbent at an adsorption pressure and an adsorption temperature of 120° C. The adsorbent was desorbed by reducing the pressure to vacuum conditions and repressurizing the samples to about 1 atm with pure propylene. FIG. 3 indicates that some adsorption/desorption irreversibility appeared indicating a relatively small buildup, or historesis, of propylene on the adsorbent in two adsorption (Ads1, Ads2) and in two desorption (Des1, Des2) cycles.

Example III

An engineering simulation of a PSA process is developed based on the isotherm data presented in Example I for a four adsorbent bed PSA process operating according to the process of the present invention. Each of the adsorbent beds is about 3 meters in length and about 0.5 meters in diameter. The adsorbent beds contain an effective amount of AlPO-14 adsorbent in a bead or pellet form having an external porosity of about 0.40. The adsorption pressure is about 1 bar and the desorption pressure is about 0.1 bar. The propylene recovery and propylene product purity which the PSA process is able to achieve as a function of the duration of the step time is shown in Table 1. In the simulation, all process steps occur over an equal step time such that the adsorption step time is equal to the desorption step time, etc. Also shown in Table 1 is a bed size factor, BSF, which relates the weight of the adsorbent to the propylene production rate per hour and is a measure of the relative amount of adsorbent required for the separation. The lower the bed size factor, the lower the amount of adsorbent and the lower the cost of the unit. In the two runs presented, at step times of 75 and 120 seconds, the PSA process is able to produce a propylene product having a 99 mol-% or better purity and a corresponding recovery of about 50 mol-%. The bed size factor for these separations is about 0.76 to about 1.1.

TABLE 1

PSA PERFORMANCE USING AlPO-14

| RUN | STEP TIME, sec | Propylene Purity, mol-% | Propylene Recovery, mol-% | Bed Size Factor |
|---|---|---|---|---|
| 1 | 75 | 99.0 | 49 | 0.76 |
| 2 | 120 | 99.4 | 53 | 1.1 |

Example IV

The simulation of the process of the present invention as presented in Example III is compared to a simulation of a similar process using a zeolite 4A adsorbent. Because the zeolite 4A has different diffusion and reactivity characteristics, the step time for each step in the process is extended to obtain a similar propylene purity. Propylene recovery and bed size factors for the zeolite 4A simulation are shown in Table 2. The simulation is based on an adsorption temperature of 100° C. over the same pressure range of Example III. The step time is presented at step times of 800 and 400 seconds to achieve propylene product purities of greater than about 99 mol-%. Surprisingly, a comparison of the results of Example III for the AlPO-14 adsorbent and the results of Example IV for zeolite 4A show that the propylene recovery obtained using AlPO-14 is at least twice the recovery obtained using the zeolite 4A, and that the adsorbent requirement for the AlPO-14 is about one-third to one-tenth that of the zeolite 4A.

TABLE 2

PSA PERFORMANCE USING ZEOLITE 4A

| RUN | STEP TIME, sec | Propylene Purity, mol-% | Propylene Recovery, mol-% | Bed Size Factor |
|---|---|---|---|---|
| 1 | 800 | 99.97 | 23.6 | 10 |
| 2 | 400 | 99.1 | 10.5 | 2.8 |

What is claimed is:

1. A process for the production of a high purity propylene stream from a mixture comprising propane and propylene, said process comprising:

a) contacting the mixture with a selective adsorbent comprising AlPO-14 at a temperature between 120° C. and below a temperature of incipient reaction at an adsorption pressure in an adsorption step to provide an adsorption effluent stream comprising propane; and b) desorbing propylene in desorption step at a desorption pressure lower than the adsorption pressure to provide a propylene product stream.

2. The process of claim 1 wherein the contacting of the mixture with the absorbent is carried out in a pressure swing adsorption process.

3. The process of claim 1 wherein the product stream comprises from about 95 to about 99.9 percent propylene.

4. A pressure swing adsorption process comprising:

a) admixing a feed stream comprising propylene and propane, and a recycle stream comprising propylene to provide a feed admixture and passing the feed admixture at an adsorption temperature between 120° C. and below a temperature of incipient reaction and at an adsorption pressure to a first absorption bed in an adsorption zone comprising at least two adsorption beds, each of the adsorption beds containing an AlPO-14 adsorbent for the selective adsorption of propylene, and withdrawing an adsorption effluent comprising propane;

b) terminating the passing of the feed admixture to the first adsorption bed prior to breakthrough of propylene, and co-currently purging in a co-purge step with a purge gas stream at a purge pressure essentially equal to the adsorption pressure and withdrawing a purge effluent stream from the first adsorption bed;

c) terminating the co-purge step and desorbing the first adsorption bed at a desorption pressure lower than the adsorption pressure in a counter-current blowdown step to provide a high purity product stream comprising propylene;

d) compressing at least a portion of the high purity product stream to provide the purge gas stream and recycling the purge effluent stream to the adsorption step to provide the recycle stream;

e) co-currently repressurizing the first adsorption bed with the feed stream; and f) repeating steps (a)–(e) to provide a continuous process.

* * * * *